(12) United States Patent
Huang

(10) Patent No.: US 11,269,221 B2
(45) Date of Patent: Mar. 8, 2022

(54) DISPLAY PANEL AND DISPLAY APPARATUS

(71) Applicant: HKC CORPORATION LIMITED, Shenzhen (CN)

(72) Inventor: Beizhou Huang, Shenzhen (CN)

(73) Assignee: HKC CORPORATION LIMITED, Shenzhen (CN)

(*) Notice: Subject to any disclaimer, the term of this patent is extended or adjusted under 35 U.S.C. 154(b) by 107 days.

(21) Appl. No.: 16/315,164

(22) PCT Filed: Jul. 19, 2018

(86) PCT No.: PCT/CN2018/096273
§ 371 (c)(1),
(2) Date: Jan. 4, 2019

(87) PCT Pub. No.: WO2019/056843
PCT Pub. Date: Mar. 28, 2019

(65) Prior Publication Data
US 2021/0333593 A1  Oct. 28, 2021

(30) Foreign Application Priority Data
Sep. 25, 2017 (CN) .......................... 201710873159.8

(51) Int. Cl.
*G02F 1/1339* (2006.01)
*G02F 1/1335* (2006.01)

(52) U.S. Cl.
CPC .... *G02F 1/13394* (2013.01); *G02F 1/133512* (2013.01); *G02F 1/133514* (2013.01)

(58) Field of Classification Search
CPC ......................................... G02F 1/1339–13398
See application file for complete search history.

(56) References Cited

U.S. PATENT DOCUMENTS

2008/0291384 A1* 11/2008 Koyama ............. G02F 1/13394
349/155
2010/0110022 A1  5/2010 Chen et al.
2010/0118255 A1* 5/2010 Hashimoto ......... G02F 1/13394
349/155

(Continued)

FOREIGN PATENT DOCUMENTS

CN       103941495 A  *  7/2014  ........... G06F 3/0443
CN       104460142 A  *  3/2015  ........... G02F 1/1339
CN       104714344 A  *  6/2015  ....... G02F 1/134363

(Continued)

*Primary Examiner* — Mariceli Santiago
(74) *Attorney, Agent, or Firm* — Hauptman Ham, LLP

(57) ABSTRACT

A display panel is provided. The display panel includes a first substrate; a second substrate; a liquid crystal layer, arranged between the first substrate and the second substrate; and a color resistance layer, formed on the first substrate or the second substrate, where a spacing unit is formed on a side, close to the second substrate, of the first substrate, and the spacing unit includes at least one first-type spacing unit and at least one second-type spacing unit; a shading layer is arranged on a side, close to the first substrate, of the second substrate, and the shading layer includes a shading area and an open area; and the shading area is positioned on the first-type spacing unit, and the open area is positioned on the second-type spacing unit.

16 Claims, 5 Drawing Sheets

(56) References Cited

U.S. PATENT DOCUMENTS

2014/0036189 A1* 2/2014 Yi ..................... G02F 1/133512
                                                                         349/43
2016/0291425 A1* 10/2016 Ma ..................... G02F 1/133707

FOREIGN PATENT DOCUMENTS

| CN | 104880878 A | | 9/2015 | |
|---|---|---|---|---|
| CN | 105158966 A | | 12/2015 | |
| CN | 107479264 A | | 12/2017 | |
| CN | 207337023 U | | 5/2018 | |
| KR | 20060000279 A | * | 1/2006 | ......... G02F 1/13394 |

* cited by examiner

DISPLAY PANEL AND DISPLAY APPARATUS

CROSS-REFERENCE TO RELATED APPLICATIONS

This application is a U.S. national Stage of International Application No. PCT/CN2018/096273, filed on Jul. 19, 2018, designating the United States, which claims priority to Chinese Patent Application No. 201710873159.8, filed with the Chinese Patent Office on Sep. 25, 2017 and entitled "DISPLAY PANEL AND DISPLAY APPARATUS", the content of each of which is hereby incorporated by reference in its entirety.

FIELD

The embodiments relate to the field of display technologies, and in particular, to a display panel and a display apparatus.

BACKGROUND

A liquid crystal display has become the mainstream in the display field because of its advantages of zero radiation, low power consumption, small heat dissipation, small size, accurate image restoration, clear character displaying and the like.

To inject liquid crystals between an upper substrate and a lower substrate of a display, a support needs to be arranged between the upper substrate and the lower substrate of the display to provide a required space. This support is generally referred to as a spacing unit. The spacing unit is generally located above a data line and a scanning line without affecting displaying, and only provides a space for separation to prevent contact between the upper and lower substrates. The substrate close to a light outlet side of the display is the upper substrate, and the lower substrate is opposite to the upper substrate.

The spacing unit generally includes a main spacing unit and an auxiliary spacing unit. The height of the main spacing unit is greater than that of the auxiliary spacing unit. The main spacing unit is used for supporting the upper substrate and the lower substrate, so as to form a filling gap of a liquid crystal layer. The auxiliary spacing unit is used for auxiliarily supporting the upper substrate or the lower substrate when an external force acts on the upper substrate or the lower substrate. Therefore, a step is needed between the main spacing unit and the auxiliary spacing unit. In the related art, the spacing unit is generally prepared on the lower substrate. However, when the spacing unit is prepared on the lower substrate, it is difficult to form the step between the main spacing unit and the auxiliary spacing unit, resulting in a non-uniform displaying phenomenon caused by pressing the display, which affects the quality of a cell process of the liquid crystal display.

SUMMARY

In view of this, the embodiments provide a display panel and a display apparatus to resolve the problems of difficulty in step formation and non-uniform displaying of a display when a spacing unit is prepared on a lower substrate in the related art.

The embodiments provide a display panel, including:
a first substrate;
a second substrate;
a liquid crystal layer, arranged between the first substrate and the second substrate; and
a color resistance layer, formed on the first substrate or the second substrate, where
a spacing unit is formed on a side, close to the second substrate, of the first substrate, and the spacing unit includes at least one first-type spacing unit and at least one second-type spacing unit;
a shading layer is arranged on the side, close to the first substrate, of the second substrate, and the shading layer includes a shading area and an open area; and
the shading area is positioned on the first-type spacing unit, and the open area is positioned on the second-type spacing unit.

Optionally, the height of the first-type spacing unit is equal to that of the second-type spacing unit.

Optionally, the spacing unit includes multiple first-type spacing units and multiple second-type spacing units, and the first-type spacing units and the second-type spacing units are alternately arranged; and
the shading layer includes multiple shading areas and multiple open areas, and the shading areas and the open areas are alternately arranged.

Optionally, the spacing unit includes multiple first-type spacing units and multiple second-type spacing units, the second-type spacing units are arranged around the first-type spacing units, and surfaces of sides, far away from the first substrate, of the first-type spacing units and the second-type spacing units are steplike.

Optionally, the shading layer is a black matrix layer, and the spacing unit is a spacer.

Optionally, the display panel further includes a pixel electrode and a common electrode; and
the pixel electrode and the common electrode are positioned on the first substrate; or
the pixel electrode is positioned on the first substrate, and the common electrode is positioned on the second substrate.

Optionally, the thickness of the shading layer is 0.5 µm to 1.5 µm.

Optionally, the shape of the spacing unit is at least one of a cylinder, a round ball or a trapezoid column.

The embodiments further provide a display panel, including:
a first substrate;
a second substrate;
a liquid crystal layer, arranged between the first substrate and the second substrate; and
a color resistance layer, formed on the first substrate or the second substrate, where
a spacing unit is formed on a side, close to the second substrate, of the first substrate, and the spacing unit is used for supporting the first substrate and the second substrate; and the spacing unit includes at least one first-type spacing unit and at least one second-type spacing unit;
a shading layer is arranged on a side, close to the first substrate, of the second substrate, and the shading layer includes a shading area and an open area;
the shading area is positioned on the first-type spacing unit, and the open area is positioned on the second-type spacing unit; and
the height of the first-type spacing unit is equal to that of the second-type spacing unit.

The embodiments further provide a display apparatus, including the above-mentioned display panel.

According to the display panel and the display apparatus provided in the embodiments, the manner of forming the step between the first-type spacing unit and the second-type spacing unit is simple, and a preparation process of the first-type spacing unit and the second-type spacing unit is simple.

DETAILED DESCRIPTION OF THE INVENTION

A display panel provided in the embodiments includes a first substrate, a second substrate, a liquid crystal layer arranged between the first substrate and the second substrate, and a color resistance layer formed on the first substrate or the second substrate, where a spacing unit is formed on a side, close to the second substrate, of the first substrate, and the spacing unit is used for supporting the first substrate and the second substrate; the spacing unit includes at least one first-type spacing unit and at least one second-type spacing unit; a shading layer is arranged on a side, close to the first substrate, of the second substrate, and the shading layer includes a shading area and an open area; and the shading area is positioned on the first-type spacing unit, and the open area is positioned on the second-type spacing unit. By the arrangement of the shading area of the shading layer on the first-type spacing unit and the arrangement of the open area of the shading layer on the second-type spacing unit, a step between the first-type spacing unit and the second-type spacing unit is formed through the shading layer. The first-type spacing unit is used for supporting the first substrate and the second substrate, so as to form a filling gap of the liquid crystal layer. The second-type spacing unit is used for auxiliarily supporting the second substrate when an external force acts on the second substrate. A manner of forming the step between the first-type spacing unit and the second-type spacing unit is simple, and a preparation process of the first-type spacing unit and the second-type spacing unit is simple.

Figure 1:
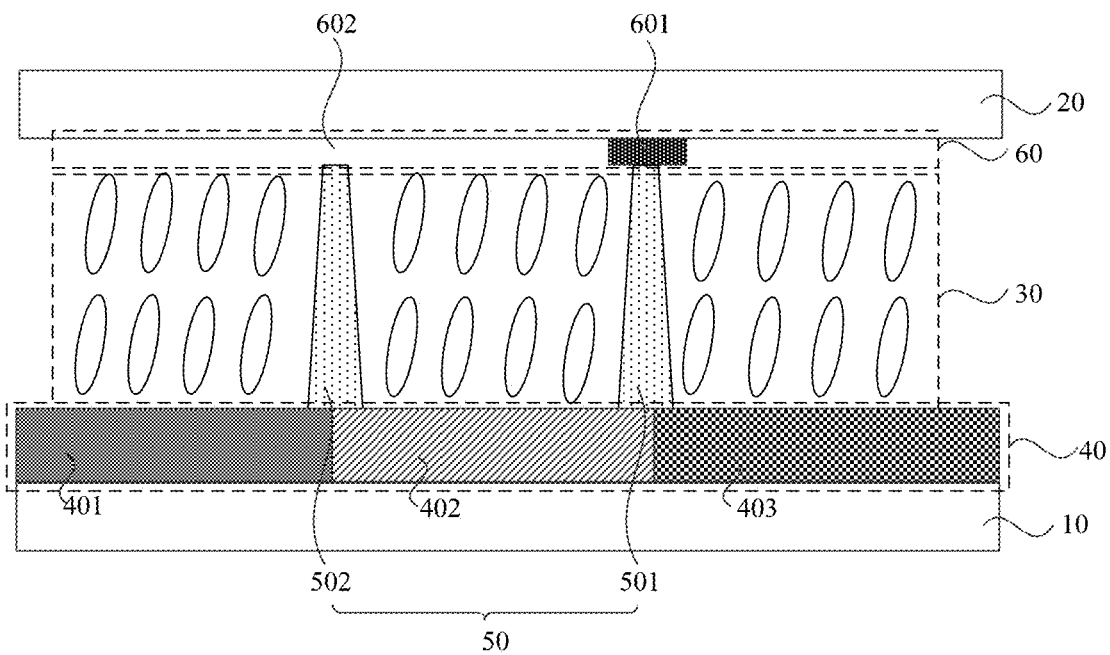
FIG. 1 is a schematic structural diagram of a display panel provided in the embodiments.

FIG. 1 is a schematic structural diagram of a display panel provided in the embodiments. As shown in FIG. 1, the display panel provided in the embodiments may include:

a first substrate 10;

a second substrate 20;

a liquid crystal layer 30, arranged between the first substrate 10 and the second substrate 20; and a color resistance layer 40, formed on a side, close to the second substrate, of the first substrate 10 or formed on a side, close to the first substrate, of the second substrate 20, where a spacing unit 50 is formed on the side, close to the second substrate 20, of the first substrate 10, and the spacing unit 50 includes a first-type spacing unit 501 and a second-type spacing unit 502;

a shading layer 60 is arranged on the side, close to the first substrate 10, of the second substrate 20, and the shading layer 60 includes a shading area 601 and an open area 602; and the shading area 601 is positioned on the first-type spacing unit 501, and the open area 602 is positioned on the second-type spacing unit 502.

For example, as shown in FIG. 1, the spacing unit 50 is formed on the side, close to the second substrate 20, of the first substrate 10, and the spacing unit 50 includes the first-type spacing unit 501 and the second-type spacing unit 502. The shading layer 60 is arranged on the side, close to the first substrate 10, of the second substrate 20, and the shading layer 60 includes the shading area 601 and the open area 602. The shading area 601 is positioned on the first-type spacing unit 501, and the open area 602 is positioned on the second-type spacing unit 502. It can be seen from FIG. 1 that the first-type spacing unit 501 and the shading area 601 are in contact with each other, the second-type spacing unit 502 and the shading area 601 are not in contact, and the step between the first-type spacing unit 501 and the second-type spacing unit 502 is formed through the shading layer 60, so as to ensure that the first-type spacing unit 501 can be used for supporting the first substrate 10 and the second substrate 20 to form a filling gap of the liquid crystal layer 30; and a gap is reserved between the second-type spacing unit 502 and the second substrate 20, and the second-type spacing unit 502 can be used for auxiliarily supporting the second substrate 20 when an external force acts on the second substrate 20.

Optionally, the color resistance layer 40 may be positioned on the first substrate 10 or on the second substrate 20. FIG. 1 only illustrates an example in which the color resistance layer is positioned on the first substrate 10. As shown in FIG. 1, the color resistance layer 40 may include a red color resistor 401, a green color resistor 402 and a blue color resistor 403. Optionally, when the color resistance layer 40 is positioned on the first substrate 10, the spacing unit 50 may be positioned on a side, close to the second substrate 20, of the color resistance layer 40.

In conclusion, by the arrangement of the shading area 601 on the first-type spacing unit 501 and the arrangement of the open area 602 on the second-type spacing unit 502, the step between the first-type spacing unit 501 and the second-type spacing unit 502 is formed through the shading layer 60. The manner of forming the step between the first-type spacing unit 501 and the second-type spacing unit 502 is simple, and a preparation process of the first-type spacing unit 501 and the second-type spacing unit 502 is simple.

Optionally, the thickness of the shading layer 60 may be 0.5 μm to 1.5 μm, thereby ensuring that the step between the first-type spacing unit 501 and the second-type spacing unit 502 may be formed only through the thickness of the shading layer 60, and ensuring that there is a step between the first-type spacing unit 501 and the second-type spacing unit 502.

Optionally, referring to FIG. 1, the height of the first-type spacing unit 501 may be equal to that of the second-type spacing unit 502. In this way, the thickness of the shading layer 60 is used as the step between the first-type spacing unit 501 and the second-type spacing unit 502. When the height of the first-type spacing unit 501 is equal to that of the second-type spacing unit 502, the first-type spacing unit 501 and the second-type spacing unit 502 may be prepared at the same time in a same masking process by using a same mask plate during preparation of the first-type spacing unit 501 and the second-type spacing unit 502. The simple preparation process of the first-type spacing unit 501 and the second-type spacing unit 502 and a simple masking process ensure high preparation efficiency of the first-type spacing unit 501 and the second-type spacing unit 502.

Optionally, the height of the first-type spacing unit 501 may not be equal to that of the second-type spacing unit 502 (not shown in the figure). For example, the height of the first-type spacing unit 501 is slightly greater than that of the second-type spacing unit 502. For example, the height of the first-type spacing unit 501 may be 0.1 μm greater than that of the second-type spacing unit 502. In this way, the thickness of the shading layer 60 increases the step between the first-type spacing unit 501 and the second-type spacing unit 502. When the height of the first-type spacing unit 501 is slightly greater than that of the second-type spacing unit 502, the first-type spacing unit 501 and the second-type spacing unit 502 may also be prepared synchronously in one masking process only by adjusting masking parameters. The preparation process is relatively simple, and the preparation efficiency is relatively high. Optionally, the shape of the spacing unit 50 may be at least one of a cylinder, a round ball or a trapezoid column. The first-type spacing unit 501 and the second-type spacing unit 502 shown in FIG. 1 are exemplarily described only by using cylinder-shaped spacing units.

Optionally, the spacing unit 50 may be a spacer, and the spacing unit 50 may be made of a photosensitive resin material such as acrylic resin, or polyimide.

Optionally, liquid crystal molecules in the liquid crystal layer 30 may be positive liquid crystal molecules or negative liquid crystal molecules.

Optionally, the shading layer 60 may be a black matrix layer, and may be made of conductive black carbon particle-doped acrylic resin or other materials.

Figure 2:
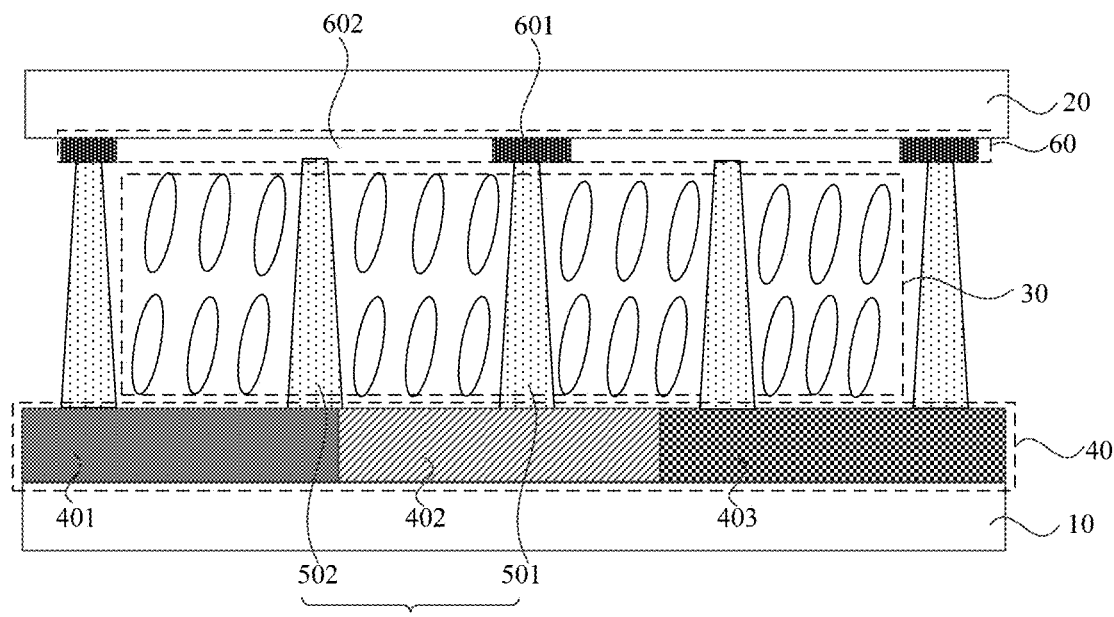
FIG. 2 is a schematic structural diagram of another display panel provided in the embodiments.

FIG. 2 is a schematic structural diagram of another display panel provided in the embodiments. The display panel shown in FIG. 2 is based on the display panel of the above-mentioned embodiment, and is improved based on the display panel of the above-mentioned embodiment. As shown in FIG. 2, a spacing unit 50 includes multiple first-type spacing units 501 and multiple second-type spacing units 502, where the first-type spacing units 501 and the second-type spacing units 502 are alternately arranged; and the shading layer 60 includes multiple shading areas 601 and multiple open areas 602, where the shading areas 601 and the open areas 602 are alternately arranged.

As shown in FIG. 2, the shading areas 601 are positioned above the first-type spacing units 501, and the open areas 602 are positioned above the second-type spacing units 502. By the alternate arrangement of the first-type spacing units 501 and the second-type spacing units 502, the first-type spacing units 501 are used for supporting a first substrate 10 and a second substrate 20, so as to form a filling gap of a liquid crystal layer 30 and ensure that an arrangement mode of the display panel is firm and reliable. The second-type spacing units are used for auxiliarily supporting the second substrate 20 when an external force acts on the second substrate 20, so as to ensure that distances between pixel units do not change, no non-uniform distance is caused, and no pressing Mura is generated when the external force acts on the second substrate 20. In addition, by the alternate arrangement of the first-type spacing units 501 and the second-type spacing units 502, during dropwise injection of liquid crystals, neither more nor fewer liquid crystals would cause Mura or abnormality, so that the requirement on a liquid crystal dropwise injection process is relatively low to ensure that the display panel preparation process is simple.

In addition, when the heights of the first-type spacing units 501 are equal to those of the second-type spacing units 502, the shading areas 601 and the open areas 602 are alternately arranged. During preparation of the shading layer 60, the shading areas 601 are positioned above the first-type spacing units 501 and the open areas 602 are positioned above the second-type spacing units 502 as long as the shading areas 601 and the open areas 602 are alternately formed in sequence. The preparation method of the entire shading layer 60 is simple.

Figure 3:
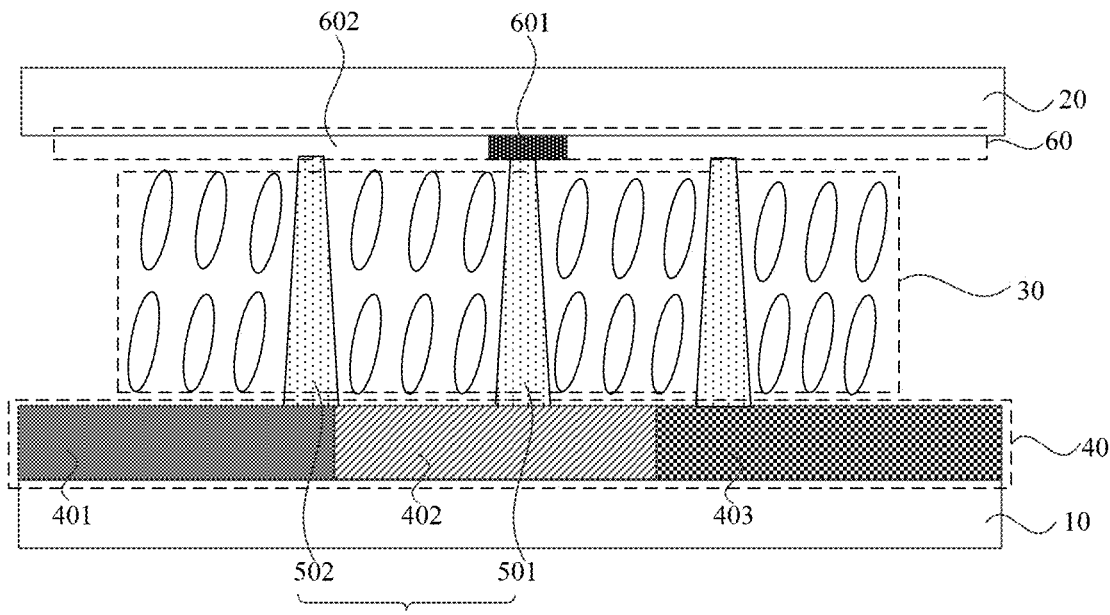
FIG. 3 is a schematic structural diagram of still another display panel provided in the embodiments.

FIG. 3 is a schematic structural diagram of yet another display panel provided in the embodiments. The display panel shown in FIG. 3 is based on the display panels of the above-mentioned embodiments, and is improved based on the display panels of the above-mentioned embodiments. The display panel shown in FIG. 3 includes multiple first-type spacing units 501 and multiple second-type spacing units 502, and the multiple second-type spacing units 502 surround the first-type spacing units 501.

Optionally, arranging the multiple second-type spacing units 502 around the first-type spacing units 501 may be that one or more first-type spacing units 501 are arranged in the middle of a graph defined by the multiple second-type spacing units 502. For example, if the multiple second-type spacing units 502 define a rectangular graph, the first-type spacing units 501 are arranged in the middle of the rectangular graph, or if the multiple second-type spacing units 502 define a circular graph, the first-type spacing units 501 are arranged in the middle of the circular graph. The display panel shown in FIG. 3 is only described by using an example in which two second-type spacing units 502 surround one first-type spacing unit 501. The first-type spacing unit 501 is used for supporting the first substrate 10 and the second substrate 20, so as to form the filling gap of a liquid crystal layer 30. A gap is reserved between the multiple second-type spacing units 502 and the second substrate 20 so as to auxiliarily support the second substrate 20 when an external force acts on the second substrate 20. For example, when multi-point touching is performed on the second substrate 20, the second substrate 20 is auxiliarily supported, so as to ensure that the distances between the pixel units do not change, no non-uniform distance is caused and no pressing Mura is generated when the external force acts on the second substrate 20, and also to ensure that the problem of light leakage caused by alignment offset between the second substrate 20 and the first substrate 10 when the external force acts on the second substrate 20 is avoided, thereby ensuring the display effect of the display panel.

Figure 4:
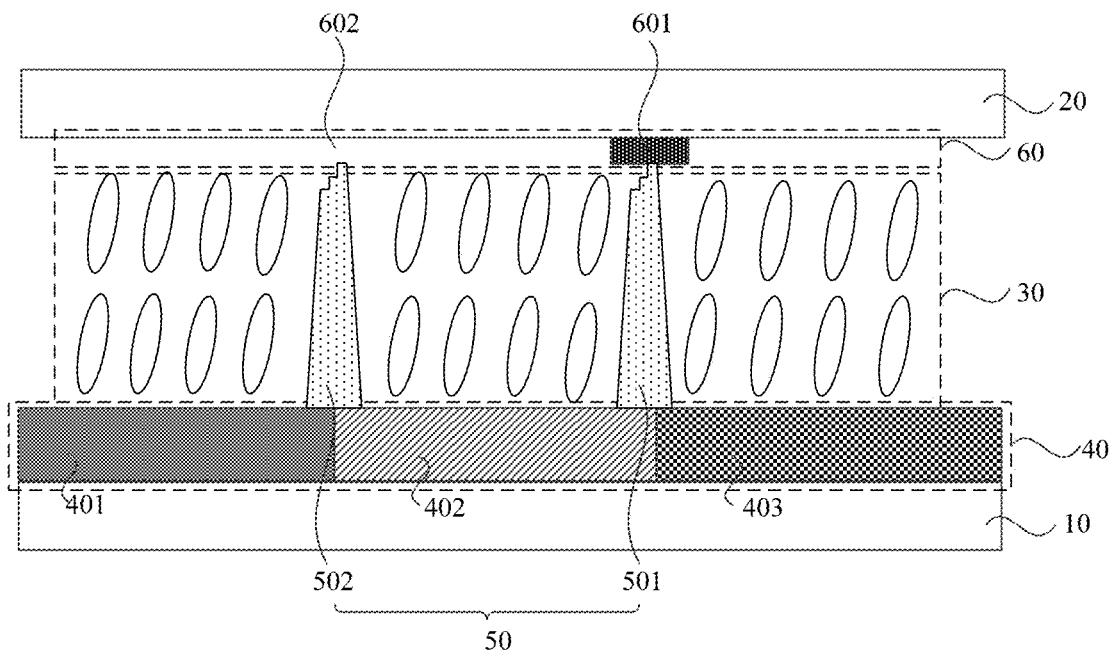
FIG. 4 is a schematic structural diagram of still another display panel provided in the embodiments.

FIG. 4 is a schematic structural diagram of another display panel provided in the embodiments. The display panel shown in FIG. 4 is based on the display panels of the above-mentioned embodiments, and is improved based on the display panels of the above-mentioned embodiments. In this embodiment, the surfaces of the sides, far away from the first substrate 10, of the first-type spacing units 501 and the second-type spacing units 502 may be flat surfaces as shown in FIG. 1, FIG. 2 and FIG. 3, or may be steplike as shown in FIG. 4, or may be slopes (not shown in the figures). The surfaces of the sides, far away from the first substrate 10, of the first-type spacing units 501 and the second-type spacing units 502 are arranged to be steplike or slopes, so as to ensure a flexible arrangement mode for the first-type spacing units 501 and the second-type spacing units 502 and a flexible arrangement mode for the whole display panel. To arrange the surfaces of the sides, far away from the first substrate 10, of the first-type spacing units 501 and the second-type spacing units 502 to be steplike or slopes, it is necessary to make the inclination degrees of the steplike or sloped surfaces of the sides, far away from the first substrate 10, of the first-type spacing units 501 and the second-type spacing units 502 the same or similar, thus ensuring that the first-type spacing units 501 and the second-type spacing units 502 may be prepared and formed in the same masking procedure, and ensuring that a preparation method of the first-type spacing units 501 and the second-type spacing units 502 is simple and the preparation efficiency of the whole display panel is improved.

Figure 5:
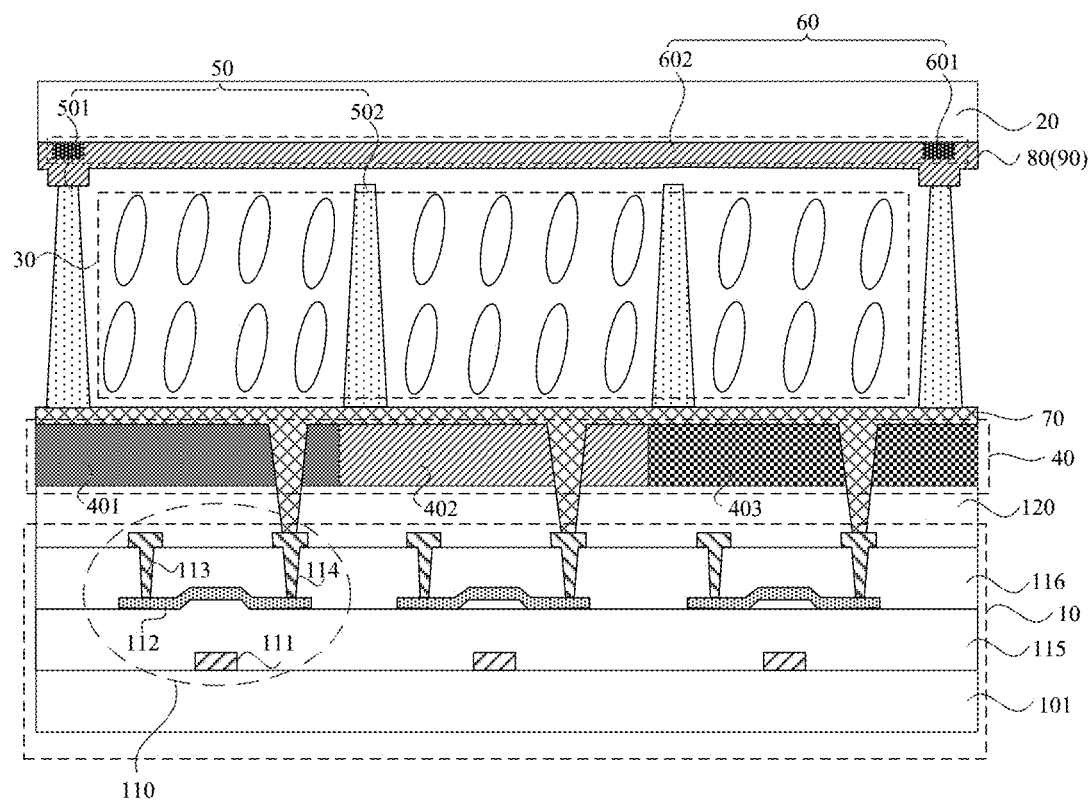
FIG. 5 is a schematic structural diagram of still another display panel provided in the embodiments.

FIG. 5 is a schematic structural diagram of still another display panel provided in the embodiments. The display panel shown in FIG. 5 is based on the display panels of the above-mentioned embodiments, and is improved based on the above-mentioned display panels. The display panel shown in FIG. 5 may further include a pixel electrode 70 and a common electrode 80, and the first substrate 10 may further include a thin film transistor 110. The pixel electrode 70 and the common electrode 80 are positioned on the first substrate 10, or the pixel electrode 70 is positioned on the first substrate 10, and the common electrode 80 is positioned on the second substrate 20.

For example, the display panel shown in FIG. 5 is described by using an example in which the pixel electrode 70 is positioned on the first substrate 10 and the common electrode 80 is positioned on the second substrate 20. As shown in FIG. 5, the first substrate 10 may include a first base substrate 101 and multiple thin film transistors 110 positioned on the first base substrate 101. The thin film transistor 110 may include a gate electrode 111, an active layer 112, a source electrode 113, a drain electrode 114, a gate insulation layer 115 and an inter-layer insulation layer 116. The thin film transistor 110 may be of a top gate structure, or may be of a bottom gate structure. FIG. 5 only illustrates the thin film transistor 110 of the bottom gate structure. In this embodiment, the thin film transistor 110 may include the gate electrode 111 positioned on the first base substrate 101; the gate insulation layer 115 positioned on a side, far away from the first base substrate 101, of the gate electrode 111; the active layer 112 positioned on a side, far away from the gate electrode 111, of the gate insulation layer 115, where the active layer 112 may include a source electrode body area, a drain electrode body area and a channel area, and the channel area corresponds to the gate electrode 111; and the inter-layer insulation layer 116 positioned on a side, far away from the gate insulation layer 115, of the active layer 112, where openings are formed in positions, corresponding to the source electrode body area and the drain electrode body area on the active layer 112, on the inter-layer insulation layer 116, and the source electrode 113 and the drain electrode 114 are electrically connected to the active layer 112 through the openings respectively.

Optionally, a flattening layer 120 may be further arranged on the first substrate 10. The flattening layer 120 is positioned on sides, far away from the inter-layer insulation layer 116, of the source electrode 113 and the drain electrode 114, and a color resistance layer 40 is positioned on a side, far away from the thin film transistor 110, on the flattening layer 120. Multiple pixel electrodes 70 are formed on a side, far away from the flattening layer 120, of the color resistance layer 40. Each pixel electrode 70 corresponds to each red color resistor 401, each green color resistor 402 and each blue color resistor 403, an opening is formed in each red color resistor 401, each green color resistor 402 and each blue color resistor 403, and the pixel electrodes 70 are electrically connected with the drain electrodes 114 in the thin film transistors 110 through the openings.

Optionally, spacing units 50 are formed on sides, close to the second substrate 20, of the pixel electrodes 70. The spacing units 50 may include first-type spacing units 501 and second-type spacing units 502. The height of each first-type spacing unit 501 may be equal or not equal to that of the second-type spacing unit 502. FIG. 5 only illustrates an example in which the height of each first-type spacing unit 501 is equal to that of the second-type spacing unit 502.

The common electrodes 80 are formed on the side, close to the first substrate 10, of the shading layer 60. The common electrodes 80 correspond to the pixel electrodes 70 and are used for driving the liquid crystal layer 30 to deflect, so as to ensure normal displaying of the display panel.

Optionally, the display panel provided in this embodiment may further be a display panel including a touch function. Correspondingly, the display panel provided in the embodiments may further include a touch electrode 90. In a touch process, the touch electrode 90 receives touch signals (not shown in the figures) provided by touch routes, to implement the touch function. Optionally, as shown in FIG. 5, the touch electrode 90 may be reused as the common electrode 80. As the common electrode 80 in the displaying process of the display panel, the touch electrode 90 cooperates with the pixel electrode 70, and is used for driving liquid crystals to deflect. In the touch process, the touch electrode 90 receives the touch signals provided by the touch routes (not shown in the figures), to implement the touch function. Optionally, by reusing the touch electrode 90 as the common electrode 80, preparation of a film layer in the display panel may be reduced, so that the preparation efficiency of the display panel is improved. In addition, the thickness of the display panel is reduced, thus providing a lighter and thinner display panel.

Referring to FIG. 1, the embodiments further provide a display panel. As shown in FIG. 1, the display panel provided in the embodiments may include:

a first substrate 10;

a second substrate 20;

a liquid crystal layer 30, arranged between the first substrate 10 and the second substrate 20; and a color resistance layer 40, formed on the first substrate 10 or the second substrate 20, where a spacing unit 50 is formed on a side, close to the second substrate 20, of the first substrate 10, and the spacing unit 50 is used for supporting the first substrate 10 and the second substrate 20; and the spacing unit 50 includes a first-type spacing unit 501 and a second-type spacing unit 502;

a shading layer 60 is arranged on the side, close to the first substrate 10, of the second substrate 20, and the shading layer 60 includes a shading area 601 and an open area 602;

the shading area 601 is positioned on the first-type spacing unit 501, and the open area 602 is positioned on the second-type spacing unit 502; and the height of the first-type spacing unit is equal to that of the second-type spacing unit.

In conclusion, a step between the first-type spacing unit 501 and the second-type spacing unit 502 is formed through the shading layer 60, the first-type spacing unit 501 is used for supporting the first substrate 10 and the second substrate 20, so as to form a filling gap of the liquid crystal layer 30, the second-type spacing unit 502 is used for auxiliarily supporting the second substrate 20 when an external force acts on the second substrate 20, and the manner of forming the step between the first-type spacing unit 501 and the second-type spacing unit 502 is simple. In addition, the height of the first-type spacing unit 501 is equal to that of the second-type spacing unit 502, so that the first-type spacing unit 501 and the second-type spacing unit 502 may be prepared at the same time in a same masking process by using a same mask plate during preparation of the first-type spacing unit 501 and the second-type spacing unit 502. The simple preparation process of the first-type spacing unit 501 and the second-type spacing unit 502 and the simple masking process ensure high preparation efficiency of the first-type spacing unit 501 and the second-type spacing unit 502.

Figure 6:
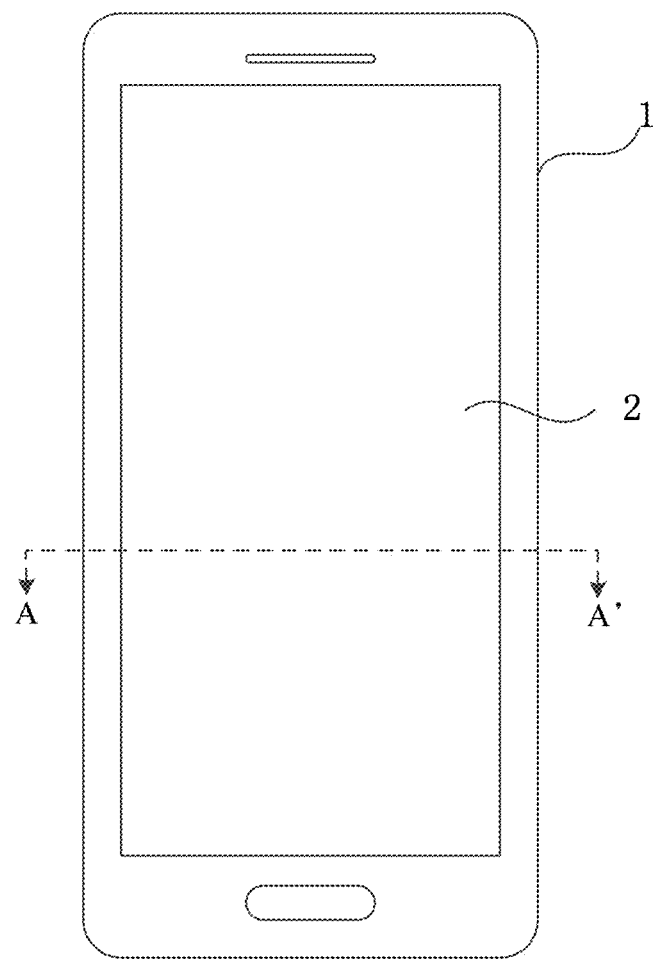
FIG. 6 is a schematic structural diagram of a display apparatus provided in the embodiments.
Figure 7:
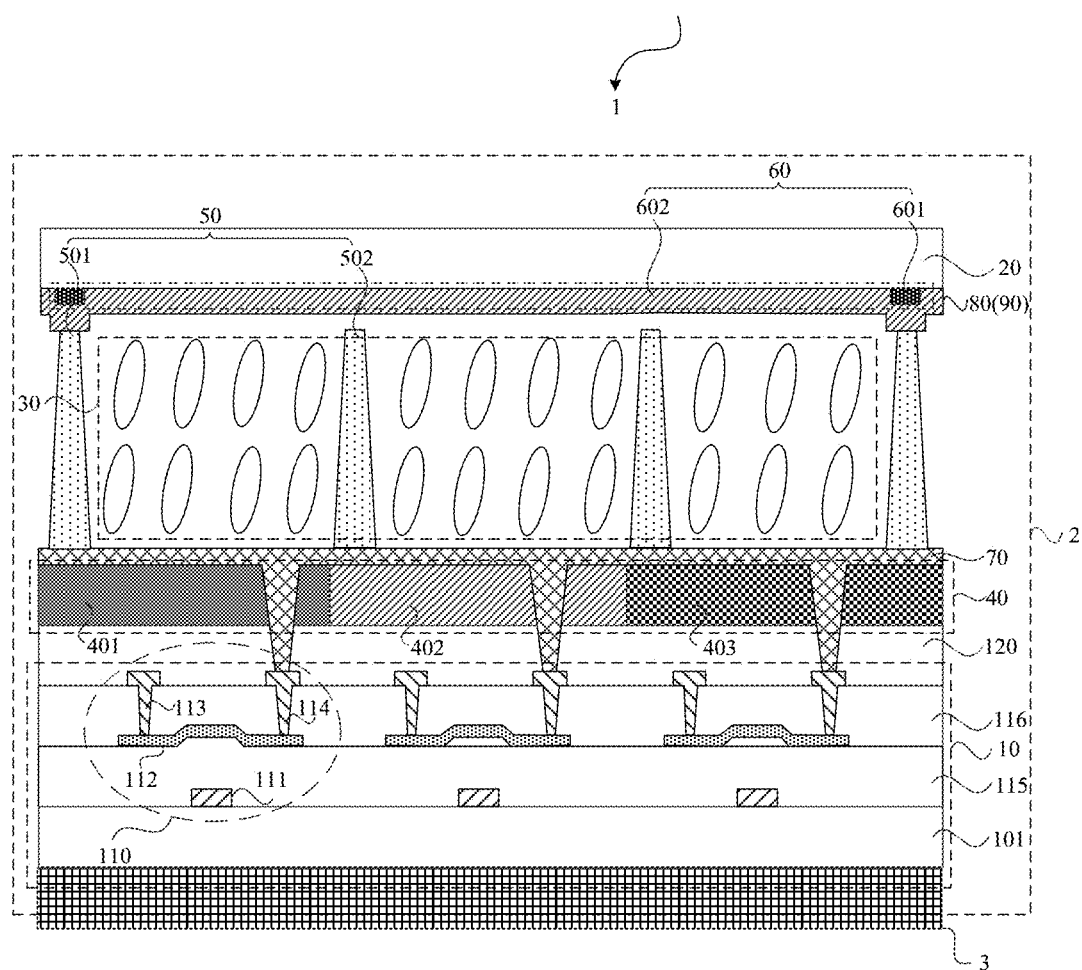
FIG. 7 is a schematic cross-sectional structural diagram of the display apparatus shown in FIG. 6 along a section line A-A'.

FIG. 6 is a schematic structural diagram of a display apparatus provided in the embodiments. FIG. 7 is a schematic cross-sectional structural diagram of the display apparatus shown in FIG. 6 along a section line A-A'. Referring to FIG. 6 and FIG. 7, a display apparatus 1 may include the display panel 2 described in any one of the embodiments, and may further include a backlight module 3. The backlight module is arranged on a side, far away from a second substrate 20, of a first substrate 10 to provide a light source for normal displaying of the display apparatus 1. Optionally, the display apparatus 1 may be a mobile phone shown in FIG. 6, or may be a computer, a television set or a smart wearable display apparatus, or the like.

The invention claimed is:

1. A display panel, comprising:
   a first substrate;
   a second substrate;
   a liquid crystal layer, arranged between the first substrate and the second substrate; and
   a color resistance layer, formed on a side, close to the second substrate, of the first substrate or on a side, close to the first substrate, of the second substrate, wherein
   a spacing unit is formed on the side, close to the second substrate, of the first substrate, and the spacing unit comprises a plurality of first-type spacing units and a plurality of second-type spacing units, and the plurality of first-type spacing units is arranged in a middle of a graph defined by the plurality of second-type spacing units;
   a shading layer is arranged on the side, close to the first substrate, of the second substrate, and the shading layer comprises a plurality of shading areas and a plurality of open areas; and
   the shading area is positioned on the first-type spacing unit, and the open area is positioned on the second-type spacing unit.

2. The display panel according to claim 1, wherein the height of the first-type spacing unit is equal to that of the second-type spacing unit.

3. The display panel according to claim 1, wherein surfaces of sides, far away from the first substrate, of the first-type spacing units and the second-type spacing units are steplike.

4. The display panel according to claim 1, wherein the shading layer is a black matrix layer, and the spacing unit is a spacer.

5. The display panel according to claim 1, further comprising a pixel electrode and a common electrode, wherein
   the pixel electrode and the common electrode are positioned on the first substrate; or
   the pixel electrode is positioned on the side, close to the second substrate, of the first substrate, and the common electrode is positioned on the side, close to the first substrate, of the second substrate.

6. The display panel according to claim 1, wherein the thickness of the shading layer is 0.5 µm to 1.5 µm.

7. The display panel according to claim 1, wherein the shape of the spacing unit is at least one of a cylinder, a round ball or a trapezoid column.

8. A display panel, comprising:
   a first substrate;
   a second substrate;
   a liquid crystal layer, arranged between the first substrate and the second substrate; and
   a color resistance layer, formed on a side, close to the second substrate, of the first substrate or on a side, close to the first substrate, of the second substrate, wherein
   a spacing unit is formed on the side, close to the second substrate, of the first substrate, and the spacing unit is used for supporting the first substrate and the second substrate; and the spacing unit comprises a plurality of first-type spacing units and a plurality of second-type spacing units, and the plurality of first-type spacing units is arranged in a middle of a graph defined by the plurality of second-type spacing units;
   a shading layer is arranged on the side, close to the first substrate, of the second substrate, and the shading layer comprises a plurality of shading areas and a plurality of open areas;
   the shading area is positioned on the first-type spacing unit, and the open area is positioned on the second-type spacing unit; and
   the height of the first-type spacing unit is equal to that of the second-type spacing unit.

9. A display apparatus, comprising:
   a display panel and a backlight module, wherein the backlight module is arranged on a side, far away from a light outlet side, of the display panel; and
   the display panel comprises:
   a first substrate;
   a second substrate;
   a liquid crystal layer, arranged between the first substrate and the second substrate; and
   a color resistance layer, formed on a side, close to the second substrate, of the first substrate or on a side, close to the first substrate, of the second substrate, wherein
   a spacing unit is formed on the side, close to the second substrate, of the first substrate, and the spacing unit comprises a plurality of first-type spacing units and a plurality of second-type spacing units, and the plurality of first-type spacing units is arranged in a middle of a graph defined by the plurality of second-type spacing units;
   a shading layer is arranged on the side, close to the first substrate, of the second substrate, and the shading layer comprises a plurality of shading areas and a plurality of open areas; and
   the shading area is positioned on the first-type spacing unit, and the open area is positioned on the second-type spacing unit.

10. The display apparatus according to claim 9, wherein the height of the first-type spacing unit is equal to that of the second-type spacing unit.

11. The display apparatus according to claim 9, wherein surfaces of sides, far away from the first substrate, of the first-type spacing units and the second-type spacing units are steplike.

12. The display apparatus according to claim 9, wherein the shading layer is a black matrix layer, and the spacing unit is a spacer.

13. The display apparatus according to claim 9, further comprising a pixel electrode and a common electrode, wherein
   the pixel electrode and the common electrode are positioned on the first substrate; or the pixel electrode is positioned on the side, close to the second substrate, of the first substrate, and the common electrode is positioned on the side, close to the first substrate, of the second substrate.

14. The display apparatus according to claim 9, wherein the thickness of the shading layer is 0.5 μm to 1.5 μm.

15. The display apparatus according to claim 9, wherein the shape of the spacing unit is at least one of a cylinder, a round ball or a trapezoid column.

16. The display panel according to claim 1, wherein the first-type spacing unit is in direct contact with the shading area.

* * * * *